(12) United States Patent
    Bae

(10) Patent No.: US 12,652,162 B2
(45) Date of Patent: Jun. 9, 2026

(54) ELECTRIC DEVICE AND KEY SWITCHING METHOD THEREOF

(71) Applicant: CRYPTO LAB INC., Seoul (KR)

(72) Inventor: Youngjin Bae, Seoul (KR)

(73) Assignee: CRYPTO LAB INC., Seoul (KR)

( * ) Notice: Subject to any disclaimer, the term of this patent is extended or adjusted under 35 U.S.C. 154(b) by 73 days.

(21) Appl. No.: 18/734,076

(22) Filed: Jun. 5, 2024

(65) Prior Publication Data

US 2025/0023715 A1    Jan. 16, 2025

(30) Foreign Application Priority Data

Jun. 5, 2023 (KR) ........................ 10-2023-0072472
May 30, 2024 (KR) ........................ 10-2024-0070717

(51) Int. Cl.
*H04L 9/06* (2006.01)
*H04L 9/08* (2006.01)
(52) U.S. Cl.
CPC .......... *H04L 9/0825* (2013.01); *H04L 9/0618* (2013.01)

(58) Field of Classification Search
CPC ..... H04L 9/0825; H04L 9/0618; H04L 9/008; H04L 2209/122
See application file for complete search history.

(56) References Cited

U.S. PATENT DOCUMENTS

2024/0267222 A1* 8/2024 Chillotti .................. H04L 9/008
2025/0175322 A1* 5/2025 Bourgerie ................ H04L 9/40

* cited by examiner

*Primary Examiner* — Hany S. Gadalla
(74) *Attorney, Agent, or Firm* — Steinfl + Bruno LLP

(57) ABSTRACT

Disclosed is an electronic device. The electronic device includes: a memory in which an input encrypted message with dimension N is stored; and a processor configured to transform the input encrypted message with dimension N into an encrypted message with dimension N', perform linear transformation on the encrypted message with dimension N', and transform the encrypted message corresponding to a result value of the linear transformation into an output encrypted message with dimension N. The N is a value smaller than N'.

12 Claims, 6 Drawing Sheets

100

100

ELECTRIC DEVICE AND KEY SWITCHING METHOD THEREOF

TECHNICAL FIELD

The present disclosure relates to an electronic device and a key switching method thereof.

BACKGROUND ART

As communication technology develops and electronic devices spread, efforts are continuously made to maintain communication security between the electronic devices. Accordingly, encryption/decryption technology is used in most communication environments.

When messages encrypted by the encryption technology are delivered to the other party, the other party needs to perform decryption in order to use the messages. In this case, the other party wastes resources and time during decrypting the encrypted data. In addition, when the third party hacks messages while the other party temporarily decrypts the messages for calculation, there is a problem in that the messages may be easily leaked to the third party.

In order to solve this problem, a homomorphic encryption method is being studied. According to the homomorphic encryption method, even if a calculation is performed on encrypted messages themselves without decrypting the encrypted information, it is possible to obtain the same result as the encrypted value after a calculation on a plain text. Accordingly, various types of calculations may be performed without decrypting the encrypted messages. In this regard, a method for more effectively processing data in an encrypted state by homomorphic encryption is required.

DISCLOSURE

Technical Problem

An object of the present disclosure is to provide an electronic device capable of performing linear transformation by reducing the capacity of a switching key and a key switching method thereof.

Technical Solution

According to an aspect of the present disclosure, an electronic device includes: a memory in which an input encrypted message with dimension N is stored; and a processor configured to transform the input encrypted message with dimension N into an encrypted message with dimension N', perform linear transformation on the encrypted message with dimension N', and transform the encrypted message corresponding to a result value of the linear transformation into an output encrypted message with dimension N. The N is a value smaller than N'.

The input encrypted message may be a ring learning with error (RLWE) encrypted message. The processor may be configured to use module learning with error (MLWE) key switching to transform the RLWE encrypted message with dimension N into an MLWE encrypted message with dimension N'.

The processor may be configured to perform a rotate-sum operation on the MLWE encrypted message with dimension N'.

The processor may be configured to transform the MLWE encrypted message corresponding to the result value of the linear transformation into the RLWE encrypted message with dimension N using RLWE key switching.

The input encrypted message may be a multi-secret ring learning with error (MSRLWE) encrypted message. The processor may be configured to transform the MSRLWE encrypted message with dimension N into an MSRLWE encrypted message with dimension N' using homomorphism and MSRLWE key switching.

The processor may be configured to perform a rotate-sum operation on the MSRLWE encrypted message with dimension N'.

The processor may be configured to transform the MSRLWE encrypted message corresponding to the result value of the linear transformation into the MSRLWE encrypted message with dimension N using MSRLWE key switching.

According to another aspect of the present disclosure, a key switching method of an electronic device includes: transforming the input encrypted message with dimension N into an encrypted message with dimension N'; performing linear transformation on the encrypted message with dimension N'; and transforming the encrypted message corresponding to a result value of the linear transformation into an output encrypted message with dimension N, in which the N is a value smaller than N'.

The input encrypted message may be an RLWE encrypted message. In the transforming into the encrypted message with dimension N', the RLWE encrypted message with dimension N may be transformed into the MLWE encrypted message with dimension N' using the MLWE key switching.

In the performing, a rotate-sum operation may be performed on the MLWE encrypted message with dimension N'.

In the transforming into the output encrypted message with dimension N, the MLWE encrypted message corresponding to the result value of the linear transformation may be transformed into the RLWE encrypted message with dimension N using the RLWE key switching.

The input encrypted message may be a MSRLWE encrypted message. In the transforming into the encrypted message with dimension N', the MSRLWE encrypted message with dimension N may be transformed into a MSRLWE encrypted message with dimension N' using homomorphism and MSRLWE key switching.

In the performing, a rotate-sum operation may be performed on the MSRLWE encrypted message with dimension N'.

In the transforming into the output encrypted message with dimension N, the MSRLWE encrypted message corresponding to the result value of the linear transformation may be transformed into the MSRLWE encrypted message with dimension N using the MSRLWE key switching.

Advantageous Effects

According to various embodiments of the present disclosure, it is possible to increase efficiency in homomorphic encryption in that the capacity of a switching key required for linear transformation may be reduced.

DESCRIPTION OF DRAWINGS

The above and other aspects, features and advantages of characteristic embodiments of the present disclosure will become more apparent from the following description in conjunction with the accompanying drawings.

MODE FOR INVENTION

Figure 1:
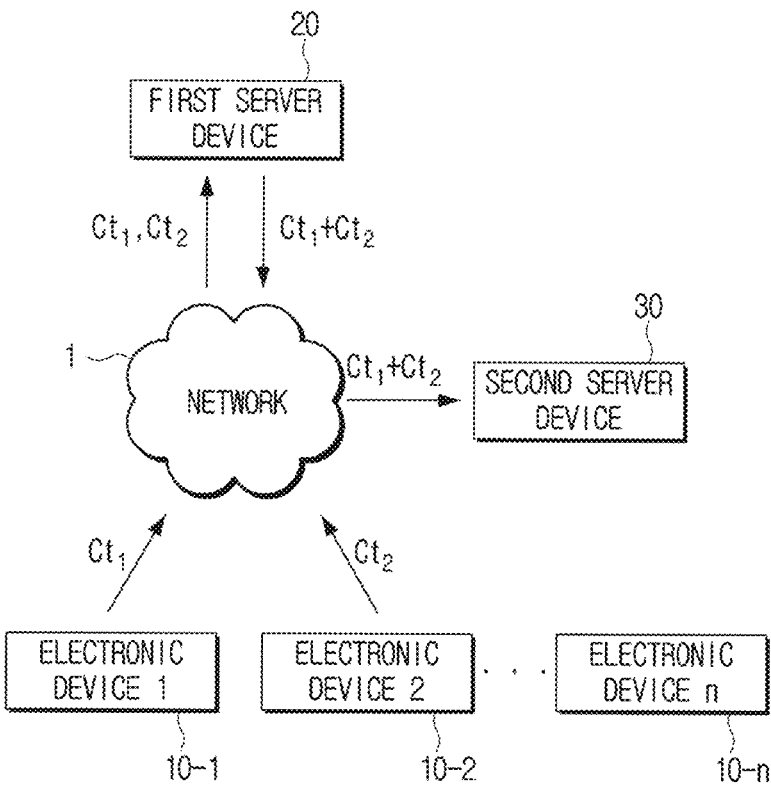
FIG. 1 is a diagram for describing a structure of a network system according to an embodiment of the present disclosure.

Hereinafter, the present disclosure will be described in detail with reference to the accompanying drawings. Encryption/decryption may be applied to an information (data) transmission process performed in the present disclosure if necessary, and all expressions describing the information (data) transmission process in the present disclosure and claims should be interpreted as including cases of encryption/decryption even if not separately stated. In the present disclosure, expressions such as "transmission (delivery) from A to B" or "A receiving from B" include transmission (delivery) or reception with another medium included therebetween, and does not necessarily express only what is directly transmitted (delivered) or received from A to B.

In the description of the present disclosure, the order of each step should be understood as non-limiting unless the preceding step needs to be logically and temporally performed necessarily before the following step. In other words, except for the above exceptional cases, even if the process described as the following step is performed before the process described as the preceding step, the nature of the disclosure is not affected, and the scope should also be defined regardless of the order of the steps. In the present disclosure, "A or B" is defined to mean not only selectively indicating either one of A and B, but also including both A and B. In addition, in the present disclosure, the term "include" has a meaning encompassing further including other components in addition to elements listed as included.

In this disclosure, only essential components necessary for the description of the present disclosure are described, and components unrelated to the essence of the present disclosure are not mentioned. In addition, it should not be interpreted as an exclusive meaning that includes only the mentioned components, but should be interpreted as a non-exclusive meaning that may include other components.

In addition, in the present disclosure, "value" is defined as a concept including a vector as well as a scalar value. In the present disclosure, the expressions such as "calculate," and "compute" may be replaced by an expression that produces a result of the corresponding calculation or computation. In addition, unless otherwise stated, a calculation on an encrypted message to be described below means a homomorphic calculation. For example, an addition of a homomorphic encrypted message means a homomorphic addition of two homomorphic encrypted messages.

Terms including an ordinal number such as first, second, or the like, used in the present disclosure may be used to describe various components. However, these components are not limited to these terms. The terms are used only in order to distinguish one component from another component.

Mathematical operations and calculations of each step of the present disclosure to be described below may be implemented as computer calculations by the known coding method and/or coding designed to suit the present disclosure in order to perform the corresponding operations or calculations.

Singular forms may include plural forms unless the context clearly indicates otherwise.

Specific equations to be described below are illustratively described among possible alternatives, and the scope of the present disclosure should not be construed as being limited to equations mentioned in the present disclosure.

For convenience of description, the present disclosure may include the following marks and definitions.

$s_1$, $s_2 \in$ R: Each of $s_1$ and $s_2$ is an element belonging to set R.

mod(q): Modular operation with element q $\lfloor \cdot \rceil$: $\lfloor \cdot \rfloor$: Round-off internal value m: Message When encrypted message ct=($\alpha$, $\beta$), an a-part of ct is $\alpha$, and a b-part of ct is $\beta$.

R: Ring

Z: Set of integers

Z[x]: Set of integer coefficient polynomials Z[x]=($a_0$+ $a_1$x+ . . . +$a_k$x$^k$|$\forall$j, $a_j \in$ Z)

$Z_Q$[x]: Set of remainders obtained by dividing set of integer coefficient polynomials by Q R=Z[x]/(f(x)): For integer coefficient polynomial f(x), it is a quotient ring obtained by assigning rule f(x)=0 to Z[x] and set of remainders divided by dividing Z[x] by f(x). For example, it is $$R_N = Z[x_N] \big/ \left( x_N^N + 1 \right) \text{ and } R_{Q,N} = Z_Q[X_N] \big/ \left( X_N^N + 1 \right).$$

For modulus Q $Q_0 Q_1 \ldots Q_{d-1}$, map$[\cdot]_{Q_j}$: $R_{Q,N} \rightarrow R_N$ is the remainder obtained by being divided by $Q_j$. That is, $[a]_{Q_j}$=a (mod $Q_j$) and a coefficient of $[a]_{Q_j}$ belongs to ($-Q_j/2$, $Q_j/2$).

The switching key refers to a public key required to restore the original structure of the encrypted message that has been transformed by a calculation in homomorphic encryption. The process of transforming an encrypted message encrypted with a secret key s into an encrypted message encrypted with another secret key s' is called key switching.

A modulus QP of the switching key is composed of Q, which is a modulus of the encrypted message for key switching, and a temporary modulus P. In this case, the product QP should be lower than a modulus limit determined by a degree N. In this case, gadget rank d=log(Q)/log(P).

Residual number system (RNS) gadget decomposition: Given $$R_N = Z[x_N] \big/ \left( x_N^N + 1 \right), R_{Q,N} = Z_Q[X_N] \big/ \left( X_N^N + 1 \right),$$

modulus Q=Q0Q1 . . . . Qd−1, function h:

$$R_{Q,N} \rightarrow R_N^d$$

may be defined as h(a)=([a]$_{Q_0}$, . . . [a]$_{Q_{d-1}}$) Here, [a]$_{Q_j}$ is the remainder obtained by dividing a by Q$_j$. In this case, h may be expressed as RNS gadget decomposition which is the gadget rank d of the given modulus Q.

Hereinafter, diverse embodiments of the present disclosure will be described in detail with reference to the accompanying drawings.

FIG. 1 is a diagram for describing a structure of a network system according to an embodiment of the present disclosure.

Referring to FIG. 1, a network system may include a plurality of electronic devices 10-1 to 10-n, a first server device 20, and a second server device 30, and devices may be connected to each other through a network 1.

The network 1 may be implemented in various types of wired and wireless communication networks, broadcasting communication networks, optical communication networks, cloud networks, etc., and each device may also be connected through methods such as Wi-Fi, Bluetooth, Near Field Communication (NFC), etc., without a separate medium.

Although FIG. 1 illustrates a plurality of electronic devices 10-1 to 10-n, the plurality of electronic devices are not necessarily used, and one device may be used. For example, the electronic devices 10-1 to 10-n may be implemented as various types of devices such as smart phones, tablets, game players, PCs, laptop PCs, home servers, and kiosks. In addition, the electronic devices 100-1 to 100-n may be implemented in the form of home appliances to which an IoT function is applied.

Users may input various information through the electronic devices 10-1 to 10-n they use. The input information may be stored in the electronic devices 10-1 to 10-n themselves, but may also be transmitted to and stored in an external electronic device for storage capacity and security reasons. In FIG. 1, the first server device 20 may serve to store such information, and the second server device 30 may serve to use some or all of the information stored in the first server device 20.

Each of the electronic devices 10-1 to 10-n may perform homomorphic encryption on the input information and transmit the homomorphic encrypted message to the first server device 20.

Each of the electronic devices 10-1 to 10-n may include encryption noise, i.e., an error, calculated in the process of performing homomorphic encryption in an encrypted message. Specifically, the homomorphic encrypted messages generated by each of the electronic devices 10-1 to 10-n may be generated in a form in which a result value including a message and an error value is restored when decrypted later using a secret key.

For example, when the homomorphic encrypted messages generated by the electronic devices 10-1 to 10-n are decrypted using a secret key, the homomorphic encrypted messages may be generated in a form that satisfies natures as in the following Equation 1.

$$Dec(ct,sk)=<ct,sk>=M+e(mod\ q) \quad \text{[Equation 1]}$$

Here, <,> denotes a usual inner product, ct denotes an encrypted message, sk denotes a secret key, M denotes a message, e denotes an encryption error value, and mod q denotes a modulus of an encrypted message. q should be selected to be greater larger than a result value M obtained by multiplying a scaling factor Δ by a message. When an absolute value of the error value e is sufficiently small compared to M, a decryption value M+e of the encrypted message is a value that may replace the original message with the same precision in significant figure calculation. Among the decrypted data, an error may be arranged on the least significant bit (LSB) side, and M may be arranged on the next least significant bit side.

When the size of the message is too small or too large, the size may be adjusted using the scaling factor. When the scaling factor is used, not only an integer type message but also a real number type message may be encrypted, and thus, the usability of the message may be greatly increased. In addition, by adjusting the size of the message using the scaling factor, a size of an area where messages exist in the encrypted message after the calculation is made, that is, a size of an effective area may also be adjusted.

According to the embodiment, a modulus q of the encrypted message may be set and used in various forms. For example, the modulus of the encrypted message may be set in the form of an exponential power q=Δ$^L$ of the scaling factor Δ. When Δ is 2, Δ may be set to a value such as q=2$^{10}$.

In addition, the homomorphic encrypted message according to the present disclosure is described on the assumption that a fixed point is used, but may be applied even when a floating point is used.

The first server device 20 may store the received homomorphic encrypted message in an encrypted message state without decrypting.

The second server device 30 may request a specific processing result for the homomorphic encrypted message from the first server device 20. The first server device 20 may perform specific calculation according to the request of the second server device 30 and then transmit the result to the second server device 30.

For example, when encrypted messages ct1 and ct2 transmitted by the two electronic devices 10-1 and 10-2 are stored in the first server device 20, the second server device 30 may request, from the first server device 20, a value obtained by summing information provided from the two electronic devices 10-1 and 10-2. The first server device 20 may perform a calculation for summing the two encrypted messages according to the request, and then transmit the result value ct$_1$+ct$_2$ to the second server device 30.

Due to the nature of the homomorphic encrypted message, the first server device 20 may perform the calculation without the decryption, and the result value is also in the form of an encrypted message. In the present disclosure, the result value acquired by the calculation is referred to as a calculation result encrypted message.

The first server device 20 may transmit the calculation result encrypted message to the second server device 30. The second server device 30 may decrypt the received calculation result encrypted message and acquire calculation result values of data included in each homomorphic encrypted message.

The first server device 20 may perform the calculation several times according to a user request. In this case, proportions of approximate messages within the calculation result encrypted messages acquired for each calculation are different. The first server device 20 may perform a bootstrapping operation when the proportions of the approximate messages exceed a threshold value. In this way, the first server device 20 may be referred to as a calculation device in that it may perform a calculation operation.

Specifically, when q is less than M in Equation 1 described above, since M+e (mod q) has a different value from M+e, the decryption becomes impossible. Therefore, the q value should always be kept greater than M. However, as the calculation progresses, the q value gradually decreases. Therefore, an operation of changing the q value so that the q value is always greater than M is required, and this operation is called the bootstrapping operation. As the bootstrapping operation is performed, the encrypted message may become calculable again.

Meanwhile, FIG. 1 illustrates a case where the electronic devices 10-1 to 10-$n$ perform the encryption and the second server device 30 performs the decryption, but is not necessarily limited thereto.

Figure 2:
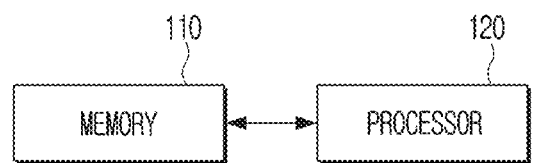
FIG. 2 is a block diagram illustrating a configuration of the electronic device according to an embodiment of the present disclosure.

FIG. 2 is a block diagram illustrating a configuration of the electronic device according to an embodiment of the present disclosure.

Referring to FIG. 2, the electronic device 100 may include a memory 110 and a processor 120. The electronic device 100 according to the present disclosure may be the electronic devices 10-1 to 10-$n$ illustrated in FIG. 1, the first server device 20, or the second server device 30.

The memory 110 is a component for storing an O/S for driving the electronic device 100 or various instructions and/or software, data, etc., related to the generation and calculation processing of the homomorphic encrypted message to be described later. The memory 110 may be implemented in various forms such as RAM, ROM, flash memory, HDD, external memory, and memory card, but is not limited to any one.

The memory 110 stores the message to be encrypted. The message may be replaced by an expression, for example, plain text, plain text message, etc.

For example, the message may be various types of credit information, personal information, and the like by a user, and may also be information related to location information used in the electronic device 100 and a use history such as Internet usage time information. However, the present disclosure is not limited thereto, and the message may include various types of information.

The memory 110 may store a public key. When the electronic device 100 directly generates the public key, the memory 110 may store not only a secret key, but also various parameters necessary for generating the public key and the secret key.

In addition, the memory 110 may store an encrypted message (e.g., a homomorphic encrypted message). The encrypted message may be generated by the electronic device 100 or may be generated by an external electronic device.

The processor 120 may control the overall operation of the electronic device 100. For example, the processor 120 may control to perform various operations of the electronic device 100 by executing at least one instruction stored in the memory 110. For example, the electronic device 100 may generate a homomorphic encrypted message and store the generated homomorphic encrypted message. In addition, the electronic device 100 may acquire the message by decrypting the homomorphic encrypted message. In addition, the electronic device 100 may transmit the homomorphic encrypted message to an external electronic device. In addition, the electronic device 100 may perform the calculation on the homomorphic encrypted message to acquire the operation result value and transmit the calculation result value to the external electronic device. In addition, the electronic device 100 may receive the homomorphic encrypted message from the external electronic device and store the received homomorphic encrypted message. For example, the processor 120 may be composed of a single device such as a central processing unit (CPU) and an application-specific integrated circuit (ASIC), or may be composed of a plurality of devices such as a CPU and a graphics processing unit (GPU).

For example, when the message is input, the processor 120 stores the message in the memory 110. The processor 120 may use various setting values and programs stored in the memory 110 to homomorphically encrypt the message. In this case, the public key may be used.

The processor 120 may generate and use a public key required to perform encryption by itself, or may receive and use the public key from an external electronic device. For example, the second server device 30 that performs the decryption may distribute a public key to other devices.

When generating a key by itself, the processor 120 may generate a public key using a ring learning with error (RLWE) technique. Specifically, the processor 120 may first set various parameters and rings and store the parameters and rings in the memory 110. Examples of the parameters may include a length of a message bit, a dimension, a rank, sizes of public and secret keys, and the like. There are various formats for the homomorphic encrypted message, and the processor 120 may set the ring according to the encrypted message method according to the method set by the user or the predetermined method. For example, the above-described homomorphic encrypted message method may be a CKKS scheme, a RLWE scheme, etc.

The ring may be expressed as Equation 2 below:

$$R = Z_q[X]/f(x) \qquad \text{[Equation 2]}$$

Here, R denotes a ring, $Z_q$ denotes a coefficient, and f(x) denotes an n-th polynomial.

The ring is a set of polynomials having predetermined coefficients, and means a set in which addition and multiplication are defined between elements and which is closed for addition and multiplication. Such a ring may be referred to as an annulus.

For example, the ring means a set of n-th polynomials having a coefficient $Z_q$. Specifically, when n is $\Phi(N)$, it refers to polynomials that may be calculated as the remainder of dividing the polynomial by an N-th cyclotomic polynomial. f(x) denotes ideal of $Z_q[x]$ generated by the f(x). The Euler totient function $\Phi(N)$ means the number of natural numbers that is coprime to N and smaller than N. When $\Phi_N(x)$ is defined as an N-th cyclotomic polynomial, the ring may also be represented by Equation 3 as follows.

$$R = Z_q[X]/\Phi_N(x) \qquad \text{[Equation 3]}$$

When such a ring is established, the processor 120 may calculate the secret key sk from the ring as Equation 4 below.

$$sk \leftarrow (1, s(x)), s(x) \in R \qquad \text{[Equation 4]}$$

Here, s(x) means a polynomial generated randomly with small coefficients.

When the ring and secret key are selected, the processor 120 calculates a first random polynomial a(x) from the ring. The first random polynomial may be expressed by Equation 5 below.

$$a(x) \leftarrow R \qquad \text{[Equation 5]}$$

In addition, the processor 120 may calculate an error. Specifically, the processor 120 may extract an error from a discrete Gaussian distribution or a distribution statistically close to the discrete Gaussian distribution. This error may be expressed by Equation 6 below.

$$e(x) \leftarrow D_{aq}^n \qquad \text{[Equation 6]}$$

When the error is calculated, the processor 120 may calculate a second random polynomial by performing a modular operation on the error in the first random polynomial and the secret key. The second random polynomial may be expressed by Equation 7 below.

$$b(x) = -a(x)s(x) + e(x)(\bmod q) \qquad \text{[Equation 7]}$$

Finally, the public key pk is set to include the first random polynomial and the second random polynomial, as Equation 8 below.

$$pk = (b(x), a(x)) \qquad \text{[Equation 8]}$$

Since the above-described key generation method is only an example, it is not necessarily limited thereto, and it goes without saying that the public key and the secret key may be generated by other methods.

The processor 120 may homomorphically encrypt the message and generate the homomorphic encrypted message for the message. Specifically, the processor 120 may generate the homomorphic encrypted message by applying the previously generated public key to the message. In this case, the processor 120 may generate the length of the encrypted message to correspond to the size of the scaling factor.

For example, the processor 120 may generate the secret key and the public key based on various parameters. Also, when it is necessary to generate the encrypted message for the message, the processor 120 may apply the public key to the message to generate the homomorphic encrypted message. For example, the processor 120 may transform a message into a polynomial form and apply the public key to the message in the transformed polynomial form to generate the homomorphic encrypted message.

The processor 120 may store the generated homomorphic encrypted message in the memory 110. In addition, the processor 120 may transmit the homomorphic encrypted message to the external electronic device according to a user request or a preset default command. For example, the processor 120 may transmit the homomorphic encrypted message to the first server device 20.

The processor 120 may decrypt the homomorphic encrypted message to generate the message. For example, when the homomorphic encrypted message needs to be decrypted, the processor 120 may apply a secret key to the homomorphic encrypted message to generate a polynomial-type decrypted message, and decode the polynomial-type decrypted message to generate a message. In this case, the generated message may include an error as mentioned in Equation 1 described above.

In addition, the processor 120 may perform the calculation on the encrypted message. In this case, the processor 120 may perform calculations such as addition or multiplication on the homomorphic encrypted message while maintaining the encrypted state. For example, when the calculation on the homomorphic encrypted message is required, the processor 120 may perform the addition or multiplication calculation on the plurality of homomorphic encrypted messages that the user requests.

As described above, the electronic device 100 according to the present embodiment may generate the homomorphic encrypted message in the message, and may improve the stability of the message even when the calculation is required. In addition, since the generated homomorphic encrypted message includes errors, the stable security may be maintained even for biometric information that requires high security.

Meanwhile, when the calculation is completed, the processor 120 may detect data in an effective area from the calculation result data. Specifically, the processor 120 may detect the data in the effective area by performing rounding processing on the calculation result data. The rounding processing means rounding-off a message in an encrypted state, and may also be referred to as rescaling.

Specifically, the processor 120 removes a noise area by multiplying each component of the encrypted message by $\Delta^{-1}$ which is the reciprocal of the scaling factor, and rounding-off each component of the encrypted message. The noise area may be determined to correspond to the size of the scaling factor. As a result, it is possible to detect a message in the effective area from which the noise area is excluded. Since it proceeds in the encrypted state, an additional error occurs, but the size is small enough to be ignored.

Figure 3:
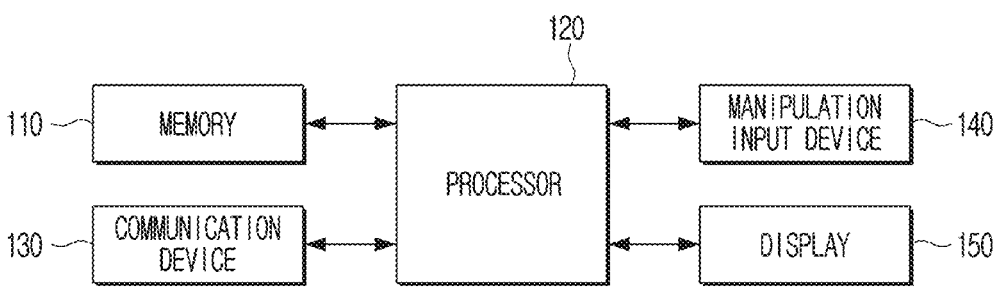
FIG. 3 is a block diagram illustrating a detailed configuration of the electronic device according to an embodiment of the present disclosure.

FIG. 3 is a block diagram illustrating a detailed configuration of the electronic device according to an embodiment of the present disclosure.

Referring to FIG. 3, the electronic device 100 may include the memory 110, the processor 120, a communication device 130, a manipulation input device 140, and a display 150. However, such components are only examples, and new components may be added to such components or some of such components may be omitted in practicing the disclosure. A detailed description for components overlapping components illustrated in FIG. 2 among components illustrated in FIG. 3 will be omitted.

The communication device 130 may perform data communication with the external electronic device under the control of the processor 120. The external electronic device may include the electronic device (e.g., electronic devices 10-1 to 10-n in FIG. 1), the server device (e.g., the first server device 20 and the second server device 30 in FIG. 1), etc.

The communication device 130 may connect the electronic device 100 to the external electronic device. For example, the electronic device 100 may be connected to the external electronic device through a local area network (LAN) or an Internet network, or connected to the external electronic device via a universal serial bus (USB) port or a wireless communication (e.g., WiFi 802.11a/b/g/n, NFC, Bluetooth) port. Such a communication device 100 may also be referred to as a transceiver.

For example, the communication device 130 may include a communication circuit that uses at least one of the data communication methods including wired LAN, wireless LAN, Wi-Fi, Wi-Fi Direct, Bluetooth, ZigBee, Wi-Fi direct (WFD), and infrared data association (IrDA), Bluetooth low energy (BLE), near field communication (NFC), wireless broadband Internet (Wibro), world interoperability for microwave access (WiMAX), shared wireless access protocol (SWAP), wireless gigabit alliances (WiGig), and RF communications to perform data communication between the electronic device 100 and the external electronic device.

The communication device 130 may receive the public key from the external device and may transmit the public key generated by the electronic device 100 to the external electronic device.

The communication device 130 may receive a message from an external electronic device and transmit the generated homomorphic encrypted message to the external electronic device. Also, the communication device 130 may receive various parameters required for generating an encrypted message from the external electronic device. In addition, the communication device 130 may transmit the calculation result encrypted message to the external electronic device. In addition, the communication device 130 may receive the homomorphic encrypted message from the external electronic device.

The manipulation input device 140 may select a function of the electronic device 100 and receive a control command for the function from the user. For example, the manipulation input device 140 may receive parameters necessary for generating a secret key and a public key from the user. Also, the manipulation input device 140 may receive the message to be encrypted from the user.

The manipulation input device 140 may include various types of input devices. For example, the manipulation input device 140 may be implemented as a keyboard, a mouse, a touch screen, etc.

The display 150 displays a user interface window for selecting a function supported by the electronic device 100. For example, the display 150 may display a user interface window for selecting various functions provided by the electronic device 100. This display 150 may be a monitor such as LCD, CRT, OLED, etc., and may also be implemented as a touch screen that may simultaneously perform the functions of the manipulation input device 140.

The display 150 may display a user interface for requesting input of parameters necessary for generating a secret key and a public key. In addition, the display 150 may display a user interface for the encryption target to select a message. Meanwhile, in implementation, the encryption target may be directly selected by a user or may be automatically selected. That is, personal information or the like that requires encryption may be automatically set even if a user does not directly select a message.

Meanwhile, in a homomorphic encryption scheme such as CKKS based on RLWE, the maximum modulus of the encrypted message and the public key (e.g., switching key) may be determined according to the degree (e.g., ring degree) N. For example, the higher the degree, the higher the maximum modulus may be. Accordingly, the gadget decomposition may be used to design practical homomorphic encryption parameters without excessively increasing the degree. In this case, the capacity (e.g., size) of the switching key increases in proportion to the gadget rank.

In the homomorphic encryption, each time the multiplication operation is performed, some of the storage capacity (e.g., modulus) of the encrypted message is consumed.

Therefore, when the modulus becomes too low, the multiplication operation may no longer be performed. To compensate for this, the modulus may be restored through the bootstrapping process so that the multiplication operation may continue to be performed. The homomorphic encryption to which the bootstrapping is applied is called fully homomorphic encryption.

Meanwhile, the gadget rank increases to maximize the number of times of possible operations (e.g., multiplication) after the bootstrapping. As a result, the capacity of the switching key increases, and thus, the efficiency decreases.

To solve this problem, in the present disclosure, the key switching may be performed using the switching key with a higher degree and a lower gadget rank. Accordingly, there is an advantage in that the capacity of the switching key decreases. The method may be particularly effective in reducing the capacity of the switching key required for linear transformation during the bootstrapping process. However, the present disclosure is not limited thereto.

Figure 4:
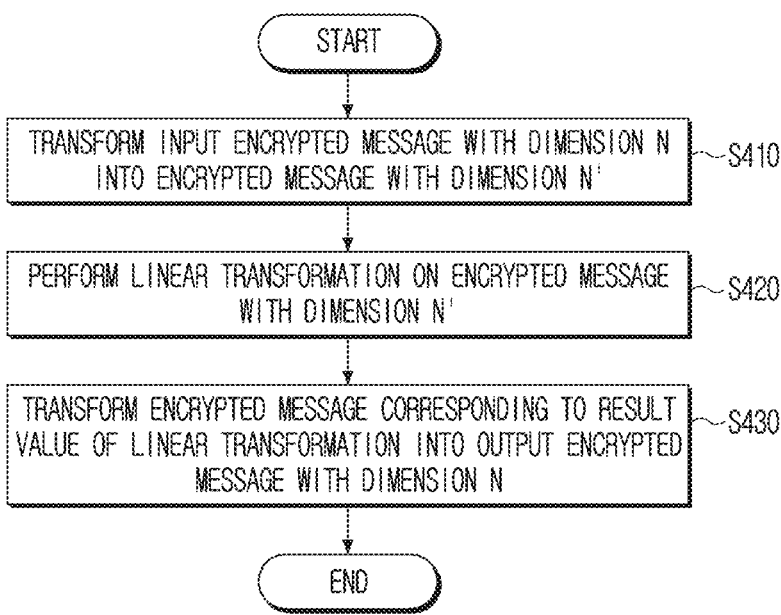
FIG. 4 is a flowchart illustrating a key switching method of an electronic device according to an embodiment of the present disclosure.

FIG. 4 is a flowchart illustrating a key switching method of an electronic device according to an embodiment of the present disclosure.

In operation S410, the processor 120 may transform an input encrypted message with dimension N into an encrypted message with dimension N'. Here, N may be a value smaller than N'. That is, dimension N' may be a higher dimension than dimension N. For example, N'=2N. However, the present disclosure is not limited thereto, and N<N'. The encrypted message with dimension N is an encrypted message encrypted with a secret key of dimension N, and the encrypted message with dimension N' is an encrypted message encrypted with a secret key of dimension N'.

In operation S420, the processor 120 may perform the linear transformation on the encrypted message with dimension N'.

In operation S430, the processor 120 may transform the encrypted message corresponding to the result value of the linear transformation into the output encrypted message with dimension N.

Hereinafter, the method of performing, by the electronic device 100, key switching will be described in more detail.

In the present disclosure, for the modulus Q of the input encrypted message and the modulus Q' of the output encrypted message, $Q = Q_0 Q_1 \ldots Q_{d-1} = Q'_0 Q'_1 \ldots Q'_{d'-1} = Q'$, and the temporary modulus corresponding to dimensions N and N' are called P and P', respectively. The gadget decomposition corresponding to the dimensions N and N', respectively, is called $h(a) = ([a]Q_0, \ldots [a]_{Q_{d-1}})$ and $h'(a) = ([a]_{Q'_0}, \ldots [a]Q'_{d'-1})$ In the dimensions N and N', the gadget ranks are d and d', respectively. Here, d>d'.

According to embodiments of the present disclosure, the input encrypted message may be an RLWE encrypted message with dimension N or a multi-secret RLWE (MSRLWE) encrypted message with dimension N.

Hereinafter, a method of performing, by the electronic device 100, key switching on an RLWE encrypted message with dimension N will be described with reference to FIG. 5, and a method of performing, by the electronic device 100, key switching on a MSRLWE encrypted message with dimension N will be described with reference to FIG. 6.

Figure 5:
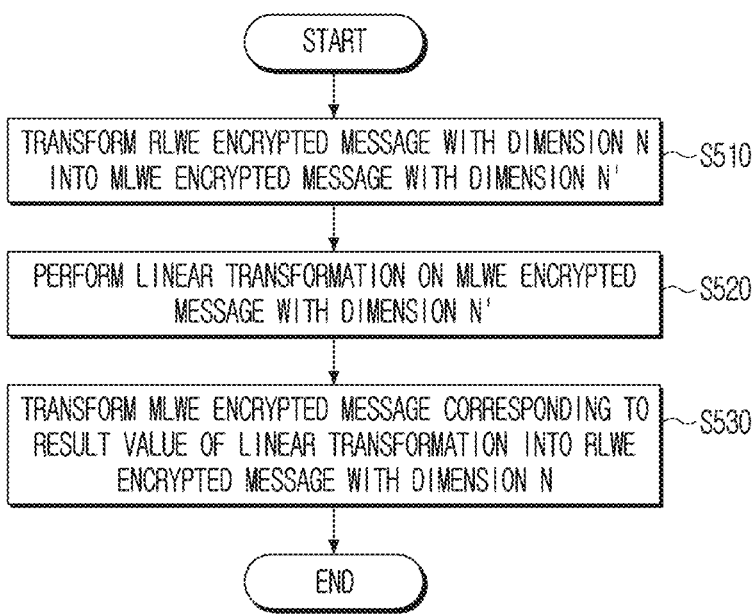
FIG. 5 is a flowchart illustrating a method of performing, by an electronic device, key switching on an RLWE encrypted message according to an embodiment of the present disclosure.

FIG. 5 is a flowchart illustrating a method of performing, by an electronic device, key switching on an RLWE encrypted message according to an embodiment of the present disclosure.

When RLWE encrypted message $$\mathrm{ct} = (a, b) \in \mathrm{ct} = (a, b) \in R_{Q,N}^2$$

is the encrypted message encrypting a message $m \in R_N$ using a secret key $s \in R_N$, for a small error $e \in R_N$, $b = -as + m + e$, and it may be expressed as $\mathrm{ct} = \mathrm{RLWE}_{Q,N}.\mathrm{Enc}_s(m)$ The degree of the RLWE encrypted message is N, and the modulus is Q. The dimension of the RLWE encrypted message is the same as the degree.

In operation S510, the processor 120 may transform the RLWE encrypted message with dimension N into the MLWE encrypted message with dimension N' using the MLWE key switching.

When the MLWE encrypted message $$ct = (\vec{a}, b) \in R_{Q,N}^{r+1}$$

is the encrypted message encrypting the message $m \in R_N$ using the secret key $$\vec{s} \in R_N^r,$$

for small error $e \in R_N$, $b = -\langle \vec{a}, \vec{s} \rangle + m + e$ and it may be expressed as $\mathrm{ct} = \mathrm{MLWE}_{Q,N,r}.\mathrm{Enc}_{\vec{s}}(m)$. The degree of the MLWE encrypted message is N, the rank is r, and the modulus is Q. The dimension of the MLWE encrypted message is a value by multiplying the degree and rank (=N×r).

Specifically, the processor 120 may apply MLWE naive key switching using DimensionSwitchKey to the RLWE encrypted message with dimension N, thereby transforming the RLWE encrypted message with dimension N into the MLWE encrypted message with dimension N'.

Hereinafter, the MLWE naive key switching will be described.

To describe the MLWE naive key switching, first, the MLWE switching key will be described.

For example, the MLWE switching key (e.g., RNS-gadget decomposed MLWE switching key) with degree N and rank r may be defined as Equation 9 below.

$$SwitchingKey = \left\{ \left( \vec{d}_k, -\langle \vec{d}_k, \vec{s}' \rangle + P\hat{Q}_k s + e_k \right) \right\}_{0 \leq k < d} \qquad \text{[Equation 9]}$$

Here, $$\hat{Q}_k = \prod_{j=0, j \neq k}^{d-1} Q_j$$

and $$\vec{d}_k \in R_{QP,N}^r, \vec{s}' \in R_N^r, s \in R_N.$$

d is the gadget rank. The MLWE switching key in Equation 9 above may be a switching key for transforming an encrypted message encrypted with the secret key s into an encrypted message encrypted with a secret key $\vec{s}'$. This MLWE switching key may be expressed as $$MLWE.SwitchingKey_{s \to \vec{s}'}^{h,N,r};$$

In this case, the MLWE naive key switching may be composed of the following processes 1) to 3). Here, it is assumed that the input encrypted message of the MLWE naive key switching is $\mathrm{ct}_{input} = (\alpha, \beta) = \mathrm{RLWE}_{Q,N}.\mathrm{Enc}_s(m)$, the output encrypted message is $\mathrm{ct}_{output} = (\vec{\alpha}', \beta') = \mathrm{MLWE}_{Q,N}.\mathrm{Enc}_{\vec{s}'}(m)$, and the switching key is $$MLWE.SwitchingKey_{s \to \vec{s}'}^{h,N,r}.$$

The dimension of the input encrypted message (i.e., RLWE encrypted message) is N. The degree of the output encrypted message (i.e., MLWE encrypted message) is N, and the rank is r. The degree of the switching key (i.e., MLWE switching key) is N, and the rank is r.

Process 1) is the process of calculating modUP of an a-part of the input encrypted message, that is, the RLWE encrypted message. For example, when the RLWE encrypted message $\mathrm{ct}_{input} = (\alpha, \beta)$, the a-part of RLWE encrypted message $\mathrm{ct}_{input}$ is $\alpha \in R_{Q,N}$. In this case, for $\alpha$, the modUP($\alpha$) may be calculated. The process of calculating the modUP($\alpha$) is the process of calculating $$\mathrm{modUp}(\alpha)_k = BaseConv_{Q_k \to QP}\left( \left[ \alpha \cdot \hat{Q}_k^{-1} \right]_{Q_k} \right) \in R_{QP,N}$$

for $0 \leq k < d$. Here, $BaseConv_{Q_k \to QP}$ may refer to a transformation that assumes that a value $[\alpha]_{Q_k}$ obtained by dividing $\alpha$ by $Q_k$ belongs to $R_N$, and embeds $[\alpha]_{Q_k}$ belonging to $R_N$ into $R_{QP,N}$.

Process 2) is the process of performing the dot product on the modUP value and the switching key, that is, the MLWE switching key. For example, the process of performing the dot product on the modUP value and the MLWE switching key may be expressed as Equation 10 below.

$$\mathrm{ct}_2 \leftarrow \mathrm{modUp}(\alpha) \cdot MLWE.SwitchingKey_{s \to \vec{s}}^{h,N,r} = \qquad \text{[Equation 10]}$$
$$\sum_{0 \leq k < d} \mathrm{modUp}(\alpha)_k \cdot \left( \vec{d}_k, -\langle \vec{d}_k, \vec{s}' \rangle + P\hat{Q}_k s + e_k \right)$$

Process 3) is the process of calculating the modDown value of the dot product result value and combining the modDown value with a b-part of the RLWE encrypted message $\mathrm{ct}_{input}$.

For example, when the dot product result value is $\mathrm{ct}_2 = (\vec{A}, B)$ the modDown value may be calculated as Equation 11 below. Here, $\vec{A} = (A_0, \ldots, A_{r-1})$.

$$\text{mod}Down(A_j) = [P]_Q^{-1} \cdot \left([A_j]_Q - BaseConv_{P \to Q}([A_j]_P)\right) \quad \text{[Equation 11]}$$

$$\text{mod}Down(B) = [P]_Q^{-1} \cdot \left([B]_Q - BaseConv_{P \to Q}([B]_P)\right)$$

Thereafter, by combining the modDown value with the b-part of the RLWE encrypted message $ct_{input}$, the output encrypted message, that is, the MLWE encrypted message, may be acquired. For example, when the RLWE encrypted message $ct_{input}=(\alpha, \beta)$, the b-part of RLWE encrypted message $ct_{input}=(\alpha, \beta)$ is $\beta$. In this case, when the output encrypted message, that is, the MLWE encrypted message $ct_{output}=(\vec{\alpha}', \beta')$, the MLWE encrypted message $ct_{output}=(\vec{\alpha}', \beta')$ may be acquired as Equation 12 below.

$$\vec{\alpha}' \leftarrow \text{mod}Down(\vec{A}) \quad \text{[Equation 12]}$$

$$\beta' \leftarrow \text{mod}Down(B) + \beta$$

The processor 120 may transform the RLWE encrypted message with dimension N into the MLWE encrypted message with dimension N' using the MLWE naive key switching described above.

Specifically, the processor 120 may apply MLWE naive key switching using DimensionSwitchKey to the RLWE encrypted message with dimension N, thereby transforming the RLWE encrypted message with dimension N into the MLWE encrypted message with dimension N'.

In this case, the DimensionSwitchKey such as the $$DimensionSwitchKey = MLWE.SwitchingKey_{s \to s^*}^{h', N, N'/N}$$

may be used as the switching key in the above-described MLWE naive key switching. In addition, when the input encrypted message of the MLWE naive key switching using the DimensionSwitchKey is $ct_{input}=RLWE_{Q,N}.Enc_s(m)$, the output encrypted message of the MLWE naive key switching using the DimensionSwitchKey may be expressed as $ct_1=MLWE_{Q,N,N'/N}.Enc_{\vec{s}^*}(m)$.

Through the MLWE naive key switching, the RLWE encrypted message encrypted with the secret key s may be transformed into the MLWE encrypted message encrypted with the secret key $\vec{s}^*$. In this case, the dimension of the RLWE encrypted message $ct_{input}$ is N, the rank is 1, and the degree is N. The dimension of the MLWE encrypted message $ct_1$ is N', the rank is N'/N, and the degree is N. The temporary secret key $$\vec{s}^* \in R_N^{N'/N}$$

is an MLWE secret key with degree N and rank N'/N, which are valid in dimension N'. Transforming the temporary secret key $\vec{s}^*$ into a compatible RLWE secret key through the process such as the linear transformation is expressed as $s^* \in R_{N'}$.

In operation S520, the processor 120 may perform the linear transformation on the encrypted message with dimension N'.

For example, the linear transformation may include the rotate-sum operation. That is, the processor 120 may perform the rotate-sum operation on the MLWE encrypted message with dimension N'.

The rotate-sum operation may be defined as Equation 13 below.

$$RotSum_{idx}(m) = \sum_{0 \le j < l} m^{\rho^{idx_j}} \quad \text{[Equation 13]}$$

Here, $idx=\{idx_0, \ldots, idx_l\} \subset Z_{N/2}$. When the rotation in the CKKS scheme is $\rho:R_N \to R_N, \rho(a(x))=a^\rho=a(x^5)$, $\rho$ is a transformation that permutes the coefficient of the polynomial, and therefore, may be equally applied to $R_{Q,N}$. Here, $\rho^j(a)=a^{\rho^j}$ is the rotation of $a(x)$ by index j.

However, the present disclosure is not limited thereto, and other linear transformations may be performed in addition to the rotate-sum operation. In the present disclosure, the rotate-sum operation may be expressed as Rotsum.

Specifically, the processor 120 may calculate the Rotsum for the encrypted message by applying a MLWE compact key switching using RotKeys to the encrypted message with dimension N'. Here, RotKeys are the switching keys required for the Rotsum.

Hereinafter, the MLWE compact key switching will be described.

To describe the MLWE compact key switching, first, the RLWE switching key and the RLWE key switching using RLWE switching key will be described.

First, the RLWE switching key (e.g. RNS-gadget decomposed RLWE switching key) in which the modulus $Q=Q_0Q_1 \ldots Q_{d-1}$ of the encrypted message, the temporary modulus P, and the corresponding gadget decomposition h:

$$R_{Q,N} \to R_N^d$$

is $h(a)=([a]_{Q_0}, \ldots [a]_{Q_{d-1}})$ may be defined as Equation 14 below.

$$SwitchingKey = \left\{\left(a_k, -a_k s' + P\hat{Q}_k s + e_k\right)\right\}_{0 \le k < d} \quad \text{[Equation 14]}$$

Here, $$\hat{Q}_k = \prod_{j=0, j \ne k}^{d-1} Q_j.$$

d is the gadget rank. The RLWE switching key in Equation 14 above may be composed of RLWE samples of d modulus QP. In addition, the RLWE switching key may be the switching key for transforming the encrypted message encrypted with the secret key s into the encrypted message encrypted with the secret key s'. When the degree of the RLWE switching key is N, the RLWE switching key may be expressed as $$RLWE.SwitchingKey_{s \to s'}^{h,N}.$$

The RLWE key switching may be composed of the following processes 1) to 3). Here, it is assumed that the input encrypted message of the RLWE key switching is $ct_{input}=(\alpha,\ \beta)=RLWE_{Q,N}.Enc_s(m)$, the output encrypted message is $ct_{output}(\alpha',\ B')=RLWE_{Q,N}.Enc_{s'}(m)$, and the switching key is $$RLWE.SwitchingKey_{s \to s'}^{h,N}.$$

The dimension of the input encrypted message (i.e., RLWE encrypted message) is N. The dimension of the output encrypted message (i.e., RLWE encrypted message) is N. The dimension of the switching key (i.e., RLWE switching key) is N.

Process 1) is the process of calculating modUP of an a-part of the input encrypted message, that is, the RLWE encrypted message. For example, when the RLWE encrypted message $ct_{input}=(\alpha,\ \beta)$, the a-part of RLWE encrypted message $ct_{input}$ is $\alpha \in R_{Q,N}$. In this case, for $\alpha$, the modUP($\alpha$) may be calculated. The process of calculating the modUP($\alpha$) is the process of calculating $$modUp(\alpha)_k = BaseConv_{Q_k \to QP}\left(\left[\alpha \cdot \hat{Q}_k^{-1}\right]_{Q_k}\right) \in R_{QP,N}$$

for $0 \leq k < d$. Here, $BaseConv_{Q_k \to OP}$ may refer to a transformation that assumes that a value $Q_k$ obtained by dividing $\alpha$ by $[\alpha]_{Q_k}$ belongs to $R_N$, and embeds $R_N$ belonging to $[\alpha]_{Q_k}$ into $R_{QP,N}$.

Process 2) is the process of performing the dot product on the modUP value and the switching key, that is, the RLWE switching key. For example, the process of performing the dot product on the modUP value and the RLWE switching key may be expressed as Equation 15 below.

$$ct_2 \leftarrow modUp(\alpha) \cdot RLWE \cdot SwitchingKey_{s \to s'}^{h,N} = \qquad \text{[Equation 15]}$$
$$\sum_{0 \leq k < d} modUp(\alpha)_k \cdot \left(a_k,\ -a_k s' + P\hat{Q}_k s + e_k\right)$$

Process 3) is the process of calculating the modDown value of the dot product result value and combining the modDown value with the b-part of the RLWE encrypted message $ct_{input}$.

For example, when the dot product result value is $ct_2=(A, B)$, the modDown value may be calculated as Equation 16 below.

$$modDown(A) = [P]_Q^{-1} \cdot \left([A]_Q - BaseConv_{P \to Q}([A]_P)\right) \qquad \text{[Equation 16]}$$
$$modDown(B) = [P]_Q^{-1} \cdot \left([B]_Q - BaseConv_{P \to Q}([B]_P)\right)$$

Thereafter, by combining the modDown value with the b-part of the RLWE encrypted message $ct_{input}$, the output encrypted message, that is, the RLWE encrypted message, may be acquired. For example, when the RLWE encrypted message $ct_{input}=(\alpha,\ \beta)$, the b-part of RLWE encrypted message $ct_{input}(\alpha,\ \beta)$ is $\beta$. In this case, when the output encrypted message, that is, the RLWE encrypted message $ct_{output}=(\alpha',\ \beta')$, the RLWE encrypted message $ct_{output}(\alpha',\ \beta')$ may be acquired as Equation 17 below.

$$\alpha' \leftarrow modDown(A) \qquad \text{[Equation 17]}$$
$$\beta' \leftarrow modDown(B) + \beta$$

Hereinafter, the MLWE compact key switching will be described.

For $$R_{q,N} = Z_q[X_N]/\left(X_N^N + 1\right) \text{ and } R_{q,N/r} = Z_q[X_{N/r}]/\left(X_{N/r}^{N/r} + 1\right),$$

it is defined as $$\beta_i = X_N^i (0 \leq i < r),$$

$\{\beta_i\}_i$ is the $R_{q,N/r}$-basis of $R_{q,N}$. That is, $R_{q,N} \simeq \sum_{0 \leq i < k} R_{q,N/r} \cdot \beta_i$. In addition, any $a \in R_{q,N}$ may be expressed as $a=\sum_j \alpha_j \beta_j$. In this case, module-decomposition map $$\pi_{q,N}^r : R_{q,N} \to (R_{q,N/r})'$$

may be defined as $$\pi_{q,N}^r(a) = (a_0, \ldots,\ a_{k-1}).$$

Also, ring embedding map $$\iota_{q,N}^r : R_{q,N/r} \to R_{q,N}$$

is $R_{q,N/r}$-homomorphism defined as $$\iota_{q,N}^r(X_{N/r}) = X_N^r.$$

Map $$\varepsilon_{q,N}^k$$

extracting a first coefficient: $R_{q,N} \to R_{q,N/k}$ may be defined as $$\varepsilon_{q,N}^k(a) = a_0.$$

Also, for $\vec{a}=(a_0, \ldots, a_{k-1}) \in R_{q,N/k})^k$, a twist $(\vec{a})^{tw}$ of $\vec{a}$ may be defined as $$(\vec{a})^{tw} = \left(a_0, a_{k-1} \cdot X_{N/k}^{-1}, a_{k-2} \cdot X_{N/k}^{-1}, \cdots, a_1 \cdot X_{N/k}^{-1}\right).$$

In this case, the inverse transform $\overrightarrow{a}^{tw^{-1}}$ of the twist is $\overrightarrow{a}^{tw^{-1}} := (a_0, a_{k-1} \cdot X_{N/k}, a_{k-2} \cdot X_{N/k}, \ldots a_1 \cdot X_{N/k})$. Given the rank k in the $R_{q,N}$, the twist $a^{tw,k}$ of $a \in R_{q,N}$ can be defined as $$a^{tw,k} = \left(\pi_{q,N}^k\right)^{-1} \circ \left(\pi_{q,N}^k(a)\right)^{tw}.$$

Additionally, MLWE embedding map $$\mathrm{Embed}_{q,N}^k (R_{q,N/k})^{k+1} \to (R_{q,N})^2$$

may be defined as $$\mathrm{Embed}_{q,N}^k(b, \overrightarrow{d}) = \left(\iota_{q,N}^k(b), \left(\pi_{q,N}^k\right)^{-1}(\overrightarrow{d}^{tw})\right).$$

In addition, MLWE extraction map $$\mathrm{Extract}_{q,N}^k : (R_{q,N})^2 \to (R_{q,N/k})^{k+1}$$

may be defined as $$\mathrm{Extract}_{q,N}^k(B, A) = \left(\varepsilon_{q,N}^k(B), \left(\pi_{q,N}^k(A)\right)^{(tw,k)^{-1}}\right).$$

In addition, the RLWE-compatible secret key $S, S' \in R_N$ may be defined as $$S = \left(\pi_{q,N}^k\right)^{-1}(\overrightarrow{s}), \; S' = \left(\pi_{q,N}^k\right)^{-1}(\overrightarrow{s}).$$

In this case, the MLWE compact key switching may be composed of the following processes 1) to 3). Here, it is assumed that the input encrypted message of the MLWE compact key switching is $ct_{input} = (\overrightarrow{\alpha}, \; \beta) = \mathrm{MLWE}_{Q,N/r,r}.\mathrm{Enc}_{\overrightarrow{s}}(m)$, the output encrypted message is $ct_{output} = (\overrightarrow{\alpha}', \beta') = \mathrm{MLWE}_{Q,N/r,r}.\mathrm{Enc}_{\overrightarrow{s}}(m)$, and the switching key is $$RLWE.SwitchingKey_{S \to S'}^{h,N}.$$

The dimension of the input encrypted message (i.e., MLWE encrypted message) is N/r, and the rank is r. The dimension of the output encrypted message (i.e., MLWE encrypted message) is N/r, and the rank is r. The dimension of the switching key (i.e., RLWE switching key) is N.

Process 1) is the process of embedding the input encrypted message, that is, the MLWE encrypted message $ct_{input}$ and transforming the input encrypted message $ct_{input}$ into the RLWE encrypted message $ct_1$. This process may be expressed as $$ct_1 = \mathrm{Embed}_{Q,N}^r(ct_{input}) = RLWE_{Q,N}.\mathrm{Enc}_s(M).$$

Here, $M \in R_{Q,N}$ may satisfy $$\varepsilon_{Q,N}^r(M) = m.$$

Process 2) is the process of acquiring $ct_2$ by applying the RLWE key switching using $$RLWE.SwitchingKey_{S \to S'}^{h,N}$$

as the switching key to the RLWE encrypted message $ct_1$. This process may be expressed as $ct_2 = RLWE_{Q,N}.\mathrm{Enc}_{S'}(M)$.

Process 3) is the process of extracting the MLWE encrypted message from the result value of process 2). This process may be expressed as $$ct_{output} = \mathrm{Extract}_{Q,N}^r(ct_2) = MLWE_{Q,N/r,r}.\mathrm{Enc}_{\overrightarrow{s'}}(m).$$

The processor 120 may calculate the RotSum for the encrypted message with dimension N' using the MLWE compact key switching described above.

Specifically, the processor 120 may calculate RotSum by applying the MLWE compact key switching using RotKeys to the MLWE encrypted message with dimension N'. Here, the MLWE encrypted message with dimension N' may be the encrypted message acquired through the MLWE naive key switching using DimensionSwitchKey, as described above.

In this case, the RotKeys such as the $$RotKey_j = RLWE.SwitchingKey_{\rho^{idx_j}(s^*) \to s^*}^{h',N'} \quad (0 \le j < \ell)$$

may be used as the switching key in the above-described MLWE compact key switching. In addition, when the input encrypted message $ct_1$ of the MLWE compact key switching using the RotKeys is $ct_1 = MLWE_{Q,N,N'/N}.\mathrm{Enc}_{\overrightarrow{s}*}(m)$ the output encrypted message $ct_2$ of the MLWE compact key switching using the RotKeys may be expressed as $ct_2 = MLWE_{Q,N,N'/N}.\mathrm{Enc}_{\overrightarrow{s}*}(RotSum(m))$ In this case, the dimension of the MLWE encrypted message $ct_1$ is N', the rank is N'/N, and the degree is N. The dimension of the MLWE encrypted message $ct_2$ is N', the rank is N'/N, and the degree is N.

In operation S530, the processor 120 may transform the MLWE encrypted message into the RLWE encrypted message with dimension N using the RLWE key switching.

Here, the MLWE encrypted message is the result value of the linear transformation. As described above, the MLWE encrypted message may be the output encrypted message $ct_2$ of the MLWE compact key switching using the RotKeys.

Specifically, the processor 120 may transform the MLWE encrypted message into the RLWE encrypted message by applying RLWE hoist key switching using HomingKeys to the MLWE encrypted message. In this case, the degree of the MLWE encrypted message is N, and the rank is N'/N. The degree of the RLWE encrypted message is N.

Hereinafter, the RLWE hoist key switching will be described.

The RLWE hoist key switching may be composed of the following processes 1) to 3). Here, it is assumed that the input encrypted message of the RLWE key switching is $ct_{input}=(\overrightarrow{\alpha}, \beta)=MLWE_{Q,N,r}.Enc_{\overrightarrow{s}}(m)$ the output encrypted message is $ct_{output}(\alpha', \beta')=RLWE_{Q,N}.Enc_{s}(m)$, and the r switching keys are $$RLWE.SwitchingKey_{s_{j\rightarrow s'}}^{h,N}, \quad (0 \leq j < r).$$

The dimension of the input encrypted message (i.e., MLWE encrypted message) is N, and the rank is r. The secret key of the input encrypted message is $$\vec{s}(s_0, \ldots, s_{r-1}) \in R_N^r.$$

The dimension of the output encrypted message (i.e., RLWE encrypted message) is N.

Process 1) is the process of calculating the modUP of the a-part of the input encrypted message, that is, the MLWE encrypted message. For example, when the MLWE encrypted message $ct_{input}=(\overrightarrow{\alpha}, \beta)$, the a-part of the MLWE encrypted message $ct_{input}$ is $$\vec{\alpha} = (\alpha_0, \ldots, \alpha_{r-1}) \in R_{Q,N}^r.$$

In this case, for $\overrightarrow{\alpha}$, the modUP($\overrightarrow{\alpha}$) may be calculated. The process of calculating the modUP($\overrightarrow{a}$) is the process of calculating $$modUp(\alpha_j)_k = BaseConv_{Q_k\rightarrow QP}\left(\left[\alpha_j \cdot \hat{Q}_k^{-1}\right]_{Q_k}\right) \in R_{QP,N}$$

for $0\leq k < d$ and $0\leq j < r$. Here, $BaseConv_{Q_k\rightarrow QP}$ may refer to a transformation that assumes that a value $[\alpha]_{Q_k}$ obtained by dividing $\alpha$ by $[\alpha]_{Q_k}$ belongs to $R_N$, and embeds $[\alpha]_{Q_k}$ belonging to $R_N$ into $R_{QP,N}$.

Process 2) is the process of performing the dot product on the modUP value and the switching key, that is, the RLWE switching key. For example, the process of performing the dot product on the modUP value and the RLWE switching key may be expressed as Equation 18 below.

$$ct_2 \leftarrow modUp(\alpha_j)_k \cdot RLWE \cdot SwitchingKey_{s_j\rightarrow s'}^{h,N} = \quad \text{[Equation 18]}$$
$$\sum_{0\leq k<d} modUp(\alpha_j)_k \cdot \left(a_{j,k}, -a_{j,k}s' + P\hat{Q}_k s_j + e_{j,k}\right)$$

Process 3) is the process of calculating the modDown value of the dot product result value and combining the modDown value with a b-part of the MLWE encrypted message $ct_{input}$.

For example, when the dot product result value is (A, B), the modDown value may be calculated as Equation 19 below.

$$modDown(A) = [P]_Q^{-1} \cdot \left([A]_Q - BaseConv_{P\rightarrow Q}([A]_P)\right) \quad \text{[Equation 19]}$$
$$modDown(B) = [P]_Q^{-1} \cdot \left([B]_Q - BaseConv_{P\rightarrow Q}([B]_P)\right)$$

Thereafter, by combining the modDown value with the b-part of the MLWE encrypted message $ct_{input}$, the output encrypted message, that is, the RLWE encrypted message, may be acquired. For example, when the MLWE encrypted message $ct_{input}=(\overrightarrow{\alpha}, \beta)$ the b-part of the MLWE encrypted message $ct_{input}=(\overrightarrow{\alpha}, \beta)$ is $\beta$. In this case, when the output encrypted message, that is, the RLWE encrypted message $ct_{output}=(\alpha', \beta')$, the RLWE encrypted message $ct_{output}=(\alpha', \beta')$ may be acquired as Equation 20 below.

$$\alpha' \leftarrow modDown(A) \quad \text{[Equation 20]}$$
$$\beta' \leftarrow modDown(B) + \beta$$

The processor 120 may transform the MLWE encrypted message, which is the result value of the linear transformation, into the RLWE encrypted message using the MLWE hoist key switching described above. Here, the degree of the MLWE encrypted message is N, and the rank is N'/N. The degree of the RLWE encrypted message is N.

In this case, the HomingKeys such as the $$HomingKey_j = RLWE.SwitchingKey_{(\vec{s}^*)_j\rightarrow s}^{h,N} \left(0 \leq j < N'/N\right)$$

may be used as the switching key in the above-described MLWE hoist key switching. In addition, when the input encrypted message of the MLWE hoist key switching using the HomingKeys is $ct_2=MLWE_{Q,N,N'/N}.Enc_{\vec{s}*}(RotSum(m))$, the output encrypted message of the MLWE hoist key switching using the HomingKeys may be expressed as $ct_{output}=RLWE_{Q,N}.Enc_s(RotSum_{idx}(m))$ In this case, the dimension of the MLWE encrypted message $ct_2$ is N', the rank is N'/N, and the degree is N. In this case, the dimension of the RLWE encrypted message $ct_{output}$ is N, the rank is 1, and the degree is N.

In this way, when the input encrypted message is the RLWE encrypted message with dimension N, the processor 120 may transform the input encrypted message (i.e., RLWE encrypted message with dimension N) into the MLWE encrypted message with dimension N' to perform the linear transformation, and transform the MLWE encrypted message corresponding to the result value of the linear transformation back into the RLWE encrypted message with dimension N, thereby acquiring the output encrypted message (i.e., RLWE encrypted message with dimension N).

Figure 6:
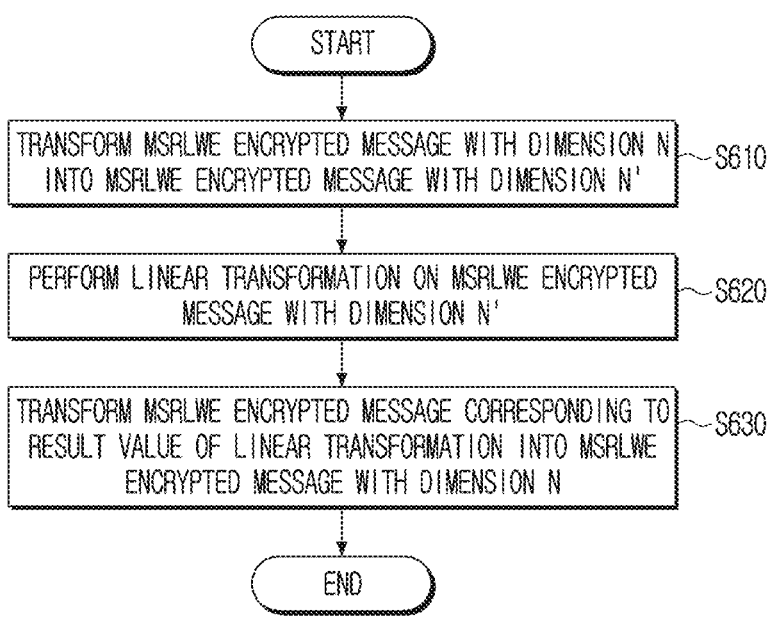
FIG. 6 is a flowchart illustrating a method of performing, by an electronic device, key switching on a MSRLWE encrypted message according to an embodiment of the present disclosure.

FIG. 6 is a flowchart illustrating a method of performing, by an electronic device, key switching on an MSRLWE encrypted message according to an embodiment of the present disclosure.

The MSRLWE encrypted message refers to the encrypted message with multiple b-parts using multiple secret keys in one a-part. For example, the MSRLWE encrypted message may have the form of a, $b_0=-as_0+m_0+e_0$, . . . , $b_{u-1}=-as_{u-1}+m_{u-1}+e_{u-1}$. Here, a, $b_j$, $s_j$, $m_j$, $e_j \in R_{Q,N}$. When the key switching is performed on the MSRLWE encrypted message using the Multi-secret type switching key, the result is still the MSRLWE encrypted message, which is more efficient than key switching the u general RLWE encrypted messages, respectively. Here, u is the secret size. The dimension of the MSRLWE encrypted message is the same as the degree.

When the MSRLWE encrypted message $$ct = \left(a, \vec{b}\right) \in R_{Q,N}^{u+1}$$

is the encrypted message that encrypts the message $$\vec{m} \in R_N^u$$

using the secret key $$\vec{s} \in R_N^u,$$

for a small error $$\vec{e} \in R_N^u, \; b_j = -as_jm_j + e_j,$$

and it may be expressed as $ct = MSRLWE_{Q,N,(u)}.Enc_{\vec{s}}(\vec{m})$.

In operation S610, the processor 120 may transform the MSRLWE encrypted message with dimension N into the MSRLWE encrypted message with dimension N' using the homomorphism and the MSRLWE key switching.

Here, the homomorphism is an injective ring homomorphism $\Phi_{N \rightarrow N'}: R_N \rightarrow R_{N'}$ defined as $$x_N \rightarrow x_{N'}^{N'/N}.$$

Through this homomorphism, $$\Phi(\vec{s}) \in R_{N'}^{uN/N'},$$

which is the lifting of $\vec{s}$ and $\Psi(\vec{s}^*)$, which is the flooring of $\vec{s}^*$, may be defined. For example, it is $$\Phi(\vec{s})_t = \sum_{0 \le j < N'/N} \Phi_{N \rightarrow N'}(s_{t \cdot N'/N+j})x_{N'}^{j}.$$

Here, when $$\left(\vec{s}^*\right)_t = \sum_{0 \le j < N'/N} \Phi_{N \rightarrow N'}\left(s_{t \cdot N'/N+j}^*\right)x_{N'}^{j}, \; \Psi\left(\vec{s}^*\right)_t = s_t^*.$$

For example, when the input encrypted message is the MSRLWE encrypted message $ct_{input} = MSRLWE_{Q,N,(u)}.Enc_{\vec{s}}(\vec{m})$, the processor 120 may transform $ct_{input}$ into the MSRLWE encrypted message $ct_1$ through $\Phi_{N \rightarrow N'}$. Here, it may be expressed as $ct_1 = MSRLWE_{Q,N',(uN/N')}.Enc_{\Phi(\vec{s})}(\Phi(\vec{m}))$. In this case, the dimension of the MSRLWE encrypted message $ct_{input}$ is N, the secret size is u, and the degree is N. The dimension of the MSRLWE encrypted message $ct_1$ is N', the secret size is uN/N', and the degree is N'.

The processor 120 may apply the MSRLWE key switching using the DimensionSwitchKey to the MSRLWE encrypted message $ct_1$ to transform the MSRLWE encrypted message $ct_1$ into the MSRLWE encrypted message $ct_2$ encrypted with the secret key $\vec{s}^*$.

Hereinafter, the MSRLWE key switching will be described.

First, the MSRLWE switching key (e.g. RNS-gadget decomposed MSRLWE switching key) in which the modulus $Q=Q_0Q_1 \ldots Q_{d-1}$ of the encrypted message, the temporary modulus P, and the corresponding gadget decomposition h:

$$R_{Q,N} \rightarrow R_N^d$$

is $h(a)=([\alpha]_{Q_0}, \ldots [\alpha]_{Q_{d-1}})$ may be defined as Equation 21 below.

[Equation 21]

$$SwitchingKey =$$

$$\left\{\left(a_k, -a_ks_0' + P\hat{Q}_ks_0 + e_{k,0}, \ldots, -a_ks_{u-1}' + P\hat{Q}_ks_{u-1} + e_{k,u-1}\right)\right\}_{0 \le k < d}$$

Here, $$\hat{Q}_k = \prod_{j=0,j\neq k}^{d-1} Q_j.$$

d is the gadget rank. The MSRLWE switching key in Equation 21 above may be composed of MSRLWE samples of d modulus QP. In addition, the MSRLWE switching key may be the switching key for transforming the encrypted message encrypted with a secret key $\vec{s}=(s_0, \ldots, s_{u-1})$ into the encrypted message encrypted with a secret key $$\vec{s}' = (s_0', \ldots, s_{u-1}').$$

When the degree of the MSRLWE switching key is N, the MSRLWE switching key may be expressed as $$MSRLWE.SwitchingKey_{\vec{s} \rightarrow \vec{s}'}^{h,N,(u)}.$$

The MSRLWE key switching may be composed of the following processes 1) to 3). Here, it is assumed that the input encrypted message of the MSRLWE key switching is $ct_{input}=(\vec{\alpha}, \vec{\beta})=MSRLWE_{Q,N,r,(u)}.Enc_{\vec{s}}(\vec{m})$, the output encrypted message is $ct_{output}=(\alpha', \vec{\beta}')=MSRLWE_{Q,N,(u)}.Enc_{\vec{s}}(\vec{m})$, and the r switching key is $$MSRLWE.SwitchingKey_{\vec{s}_j \rightarrow \vec{s}}^{h,N,(u)}(0 \le j < r).$$

The dimension of the input encrypted message (i.e., MSRLWE encrypted message) is N, the rank is r, and the secret size is u. The secret key of the input encrypted message is $$\vec{S} = (\vec{s}_0, \dots, \vec{s}_{u-1}) \in R_N^u,$$

where $\vec{s}_j = (s_{j,0}, \dots, s_{j,r-1})$ $(0 \le j < u)$.

Process 1) is the process of calculating the modUP of the a-part of the input encrypted message, that is, the MSRLWE encrypted message. For example, when the MSRLWE encrypted message $ct_{input} = (\vec{\alpha}, \vec{\beta})$ the a-part of the MSRLWE encrypted message $ct_{input}$ is $$\vec{a} = (a_0, \dots, a_{r-1}) \in R_{Q,N}^r.$$

In this case, for $\vec{\alpha}$, the modUP($\vec{\alpha}$) may be calculated. The process of calculating the modUP($\vec{\alpha}$) is the process of calculating $$modUp(a_j)_k = BaseConv_{Q_k \to QP} \left( \left[ a_j \cdot \hat{Q}_k^{-1} \right]_{Q_k} \right) \in R_{QP,N}$$

for $0 \le k < d$ and $0 \le j < r$. Here, $BaseConv_{Q_k \to QP}$ may refer to a transformation that assumes that a value $[\alpha]_{Q_k}$ obtained by dividing $\alpha$ by $Q_k$ belongs to $R_N$, and embeds $[\alpha]_{Q_k}$ belonging to $R_N$ into $R_{QP,N}$.

Process 2) is the process of performing the dot product on the modUP value and the switching key, that is, the MSRLWE switching key. For example, the process of performing the dot product on the modUP value and the MSRLWE switching key may be expressed as Equation 22 below.

$$ct_2 \leftarrow modUp(\alpha_j)_k \cdot MSRLWE \cdot SwitchingKey_{\vec{s}_j \to \vec{s}'}^{k,N,(u)} \qquad \text{[Equation 22]}$$

Process 3) is the process of calculating the modDown value of the dot product result value and combining the modDown value with the b-part of the MSRLWE encrypted message $ct_{input}$.

For example, when the dot product result value is $ct_2 = (\vec{A}, \vec{B})$, the modDown value may be calculated as Equation 23 below. Here, $\vec{A} = (A_0, \dots, A_{r-1})$ and $\vec{B} = (B_0, \dots, B_{r-1})$.

$$modDown(A_j) = [P]_Q^{-1} \cdot \left( [A_j]_Q - BaseConv_{P \to Q}([A_j]_P) \right) \qquad \text{[Equation 23]}$$

$$modDown(B_j) = [P]_Q^{-1} \cdot \left( [B_j]_Q - BaseConv_{P \to Q}([B_j]_P) \right)$$

Thereafter, by combining the modDown value with the b-part of the MSRLWE encrypted message $ct_{input}$, the output encrypted message, that is, the MSRLWE encrypted message, may be acquired. For example, when the MSRLWE encrypted message $ct_{input} = (\vec{\alpha}, \vec{\beta})$, the b-part of the MSRLWE encrypted message $ct_{input} = (\vec{\alpha}, \vec{\beta})$ is $\vec{\beta}$. In this case, when the output encrypted message, that is, the MSRLWE $ct_{output} = (\vec{a}', \vec{\beta}')$, the MSRLWE encrypted message $ct_{output} = (\vec{\alpha}', \vec{\beta}')$ may be acquired as Equation 24 below.

$$\vec{a}' \leftarrow modDown(\vec{A}) \qquad \text{[Equation 24]}$$
$$\vec{\beta}' \leftarrow modDown(\vec{B}) + \vec{\beta}$$

In the present disclosure, when r=1 in the MSRLWE key switching processes, the above-described MSRLWE key switching process is referred to as the MSRLWE key switching, and when r≥2 in the above-described MSRLWE key switching processes, the above-described MSRLWE key switching process is referred to as the MSRLWE hoist key switching.

The processor 120 may use the above-described MSRLWE key switching to transform the MSRLWE encrypted message $ct_1$ into the MSRLWE encrypted message $ct_2$ encrypted with the secret key $\vec{s}*$.

Specifically, the processor 120 may apply the MSRLWE key switching using the DimensionSwitchKey to the MSRLWE encrypted message $ct_1$ to transform the MSRLWE encrypted message $ct_1$ into the MSRLWE encrypted message $ct_2$ encrypted with the secret key $\vec{s}*$.

In this case, the DimensionSwitchKey such as the $$DimensionSwitchKey = MSRLWE.SwitchingKey_{\Phi(\vec{s}) \to \vec{s}'}^{h',N',(uN/N')}$$

may be used as the switching key in the above-described MSRLWE key switching. In addition, when the input encrypted message of the MSRLWE key switching using the DimensionSwitchKey is $ct_1 = MSRLWE_{Q,N',(uN/N')} \cdot Enc_{\Phi(\vec{s})}(\Phi(\vec{m}))$, the output encrypted message of the MSRLWE key switching using the DimensionSwitchKey may be expressed as $ct_2 = MSRLWE_{Q,N',(uN/N')} \cdot Enc_{\vec{s}*} (\Phi(\vec{m}))$.

Through the MSRLWE key switching, the MSRLWE encrypted message $ct_1$ may be transformed into the MSRLWE encrypted message $ct_2$ encrypted with the secret key $\vec{s}*$. The dimension of the MSRLWE encrypted message $ct_1$ is N', the secret size is uN/N', and the degree is N'. The dimension of the MSRLWE encrypted message $ct_2$ is N', the secret size is uN/N', and the degree is N'. The temporary secret key $$\vec{s}* \in R_{N'}^{uN/N'}$$

is the MSRLWE secret key with a valid secret size of uN/N' in the dimension N'.

In operation S620, the processor 120 may perform the linear transformation on the encrypted message with dimension N'.

For example, the linear transformation may include the rotate-sum operation. That is, the processor 120 may perform the rotate-sum operation on the MLWE encrypted message with dimension N'. Meanwhile, the rotate-sum operation has been described above.

Specifically, the processor 120 may calculate the RotSum by applying the MSRLWE key switching using the RotKeys to the MLWE encrypted message with dimension N'. Here, the MLWE encrypted message with dimension N' may be the encrypted message acquired through the MSRLWE key switching using DimensionSwitchKey, as described above.

In this case, the RotKeys such as the $$RotKey_j = MSRLWE \cdot SwitchingKey_{\rho^{idx}{}_j\left(\overrightarrow{s^*}\right)\rightarrow \overrightarrow{s^*}}^{h',N'(uN/N')} (0 \le j < \ell)$$

may be used as the switching key in the above-described MSRLWE key switching. In addition, when the input encrypted message $ct_2$ of the MSRLWE key switching using the RotKeys is $ct_2 = MSRLWE_{Q,N',(uN/N')} \cdot Enc_{\overrightarrow{s}*}(\Phi(\overrightarrow{m}))$, the output encrypted message $ct_3$ of the MSRLWE key switching using the RotKeys may be expressed as $ct_3 = MSRLWE_{Q,N',(uN/N')} \cdot Enc_{\overrightarrow{s}*}(RotSum_{idx}(\Phi(\overrightarrow{m})))$. In this case, the dimension of the MSRLWE encrypted message $ct_2$ is N', the secret size is uN/N', and the degree is N'. The dimension of the MSRLWE encrypted message $ct_3$ is N', the secret size is uN/N', and the degree is N'.

In operation S530, the processor 120 may transform the MSRLWE encrypted message into the MSRLWE encrypted message with dimension N using the MSRLWE key switching.

Here, the MSRLWE encrypted message is the result value of the linear transformation. As described above, the MSRLWE encrypted message may be the output encrypted message $ct_3$ of the MSRLWE key switching using the RotKeys.

Specifically, the processor 120 may transform the MSRLWE encrypted message into the MSRLWE encrypted message with dimension N by applying the MSRLWE hoist key switching using the HomingKeys to the MSRLWE encrypted message.

In this case, the HomingKeys such as the $$HomingKey_j = MSRLWE.SwitchingKey_{\psi\left(\overrightarrow{s^*}\right)\rightarrow \overrightarrow{s}}^{h,N,u} (0 \le j < N'/N)$$

may be used as the switching key in the above-described MSRLWE hoist key switching. In addition, when the input encrypted message of the MSRLWE hoist key switching using the HomingKeys is $ct_3 = MSRLWE_{Q,N',(uN/N')} \cdot Enc_{\overrightarrow{s}*}(RotSum_{idx}(\Phi(\overrightarrow{m})))$, the output encrypted message of the MSRLWE hoist key switching using the HomingKeys may be expressed as $ct_{output} = MSRLWE_{Q,N,(u)} \cdot Enc_{\overrightarrow{s}}(RotSum_{idx}(\overrightarrow{m}))$. In this case, the dimension of the MSRLWE encrypted message $ct_3$ is N', the secret size is uN/N', and the degree is N'. The dimension of the MSRLWE encrypted message $ct_{output}$ is N, the secret size is u, and the degree is N. In this way, when the input encrypted message is the MSRLWE encrypted message with dimension N, the processor 120 may transform the input encrypted message (i.e., MSRLWE encrypted message with dimension N) into the MSRLWE encrypted message with dimension N' to perform the linear transformation, and transform the MSRLWE encrypted message corresponding to the result value of the linear transformation back into the MSRLWE encrypted message with dimension N, thereby acquiring the output encrypted message (i.e., MSRLWE encrypted message with dimension N).

Meanwhile, various embodiments of the present disclosure described above may be implemented in a computer or a computer readable recording medium using software, hardware, or a combination of software and hardware. In some cases, embodiments described in the disclosure may be implemented as a processor itself. According to a software implementation, embodiments such as procedures and functions described in the specification may be implemented as separate software modules. Each of the software modules may perform one or more functions and operations described in the disclosure.

Meanwhile, computer instructions for performing processing operations of the electronic devices according to the diverse embodiments of the disclosure described above may be stored in a non-transitory computer-readable medium. The computer instructions stored in the non-transitory computer-readable medium allow a specific device to perform the processing operations in the electronic device 100 according to the diverse embodiments described above when they are executed by a processor of the specific device.

The non-transitory computer-readable medium is not a medium that stores data for a while, such as a register, a cache, a memory, or the like, but means a medium that semi-permanently stores data and is readable by the device. Specific examples of the non-transitory computer-readable medium may include a compact disk (CD), a digital versatile disk (DVD), a hard disk, a Blu-ray disk, a USB, a memory card, a read only memory (ROM), and the like.

Although the embodiments of the disclosure have been illustrated and described hereinabove, the disclosure is not limited to the specific embodiments described above, but may be variously modified by those skilled in the art to which the disclosure pertains without departing from the gist of the disclosure as disclosed in the accompanying claims. These modifications should also be understood to fall within the scope and spirit of the disclosure.

The invention claimed is:

1. An electronic device, comprising:

a memory in which an input encrypted message with dimension N is stored; and a processor configured to transform the input encrypted message with dimension N into an encrypted message with dimension N', perform linear transformation on the encrypted message with dimension N', and transform the encrypted message corresponding to a result value of the linear transformation into an output encrypted message with dimension N, wherein the N is smaller than N', and wherein the processor is configured to perform the linear transformation by performing a rotate-sum operation on the encrypted message with dimension N'.

2. The electronic device as claimed in claim 1, wherein the input encrypted message is a ring learning with error (RLWE) encrypted message, and the processor is configured to use module learning with error (MLWE) key switching to transform the RLWE encrypted message with dimension N into an MLWE encrypted message with dimension N'; and wherein the processor is configured to perform the rotate-sum operation on the MLWE encrypted message with dimension N'.

3. The electronic device as claimed in claim 2, wherein the processor is configured to transform the MLWE encrypted message corresponding to the result value of the linear transformation into the RLWE encrypted message with dimension N using RLWE key switching.

4. The electronic device as claimed in claim 1, wherein the input encrypted message is a multi-secret ring learning with error (MSRLWE) encrypted message, and the processor is configured to transform the MSRLWE encrypted message with dimension N into a MSRLWE encrypted message with dimension N' using homomorphism and MSRLWE key switching.

5. The electronic device as claimed in claim 4, wherein the processor is configured to perform a rotate-sum operation on the MSRLWE encrypted message with dimension N'.

6. The electronic device as claimed in claim 5, wherein the processor is configured to transform the MSRLWE encrypted message corresponding to the result value of the linear transformation into the MSRLWE encrypted message with dimension N using MSRLWE key switching.

7. A key switching method of an electronic device, comprising:

transforming an input encrypted message with dimension N into an encrypted message with dimension N';

performing linear transformation on the encrypted message with dimension N'; and transforming the encrypted message corresponding to a result value of the linear transformation into an output encrypted message with dimension N, wherein the N is smaller than N', and wherein the performing the linear transformation comprises performing a rotate-sum operation on the encrypted message with dimension N'.

8. The key switching method as claimed in claim 7, wherein the input encrypted message is an RLWE encrypted message, and in the transforming into the encrypted message with dimension N', the RLWE encrypted message with dimension N is transformed into an MLWE encrypted message with dimension N' using MLWE key switching; and wherein in the performing, the rotate-sum operation is performed on the MLWE encrypted message with dimension N'.

9. The key switching method as claimed in claim 8, wherein in the transforming into the output encrypted message with dimension N, the MLWE encrypted message corresponding to the result value of the linear transformation is transformed into the RLWE encrypted message with dimension N using the RLWE key switching.

10. The key switching method as claimed in claim 7, wherein the input encrypted message is an MSRLWE encrypted message, and in the transforming into the encrypted message with dimension N', the MSRLWE encrypted message with dimension N is transformed into a MSRLWE encrypted message with dimension N' using homomorphism and MSRLWE key switching.

11. The key switching method as claimed in claim 10, wherein in the performing, a rotate-sum operation is performed on the MSRLWE encrypted message with dimension N'.

12. The key switching method as claimed in claim 11, wherein in the transforming into the output encrypted message with dimension N, the MSRLWE encrypted message corresponding to the result value of the linear transformation is transformed into the MSRLWE encrypted message with dimension N using the MSRLWE key switching.

* * * * *